April 23, 1940.  J. M. GWINN, JR  2,198,496
AIRCRAFT
Filed Dec. 1, 1937   2 Sheets-Sheet 1
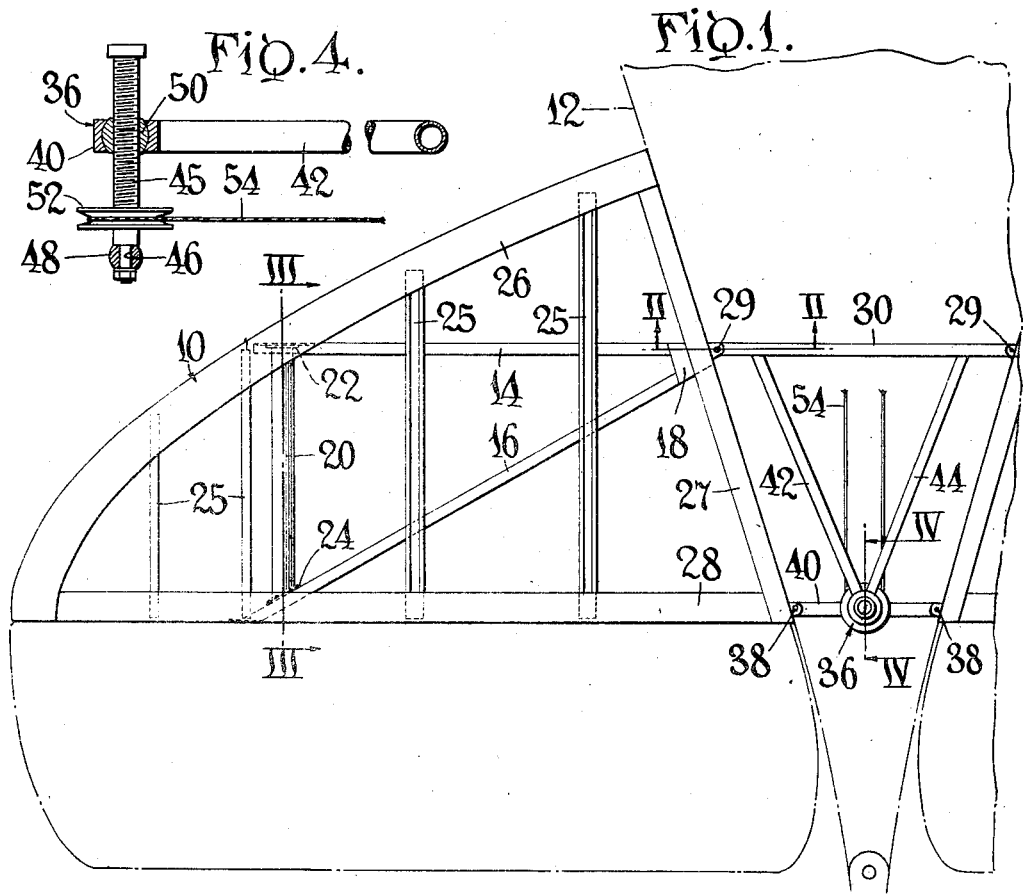
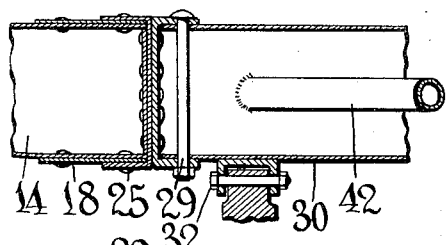
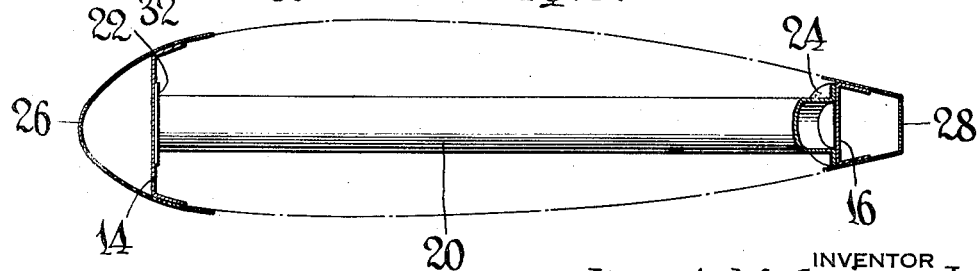
INVENTOR
Joseph M. Gwinn, Jr.,
BY
Beau, Brooks, Buckley & Beau.
ATTORNEYS

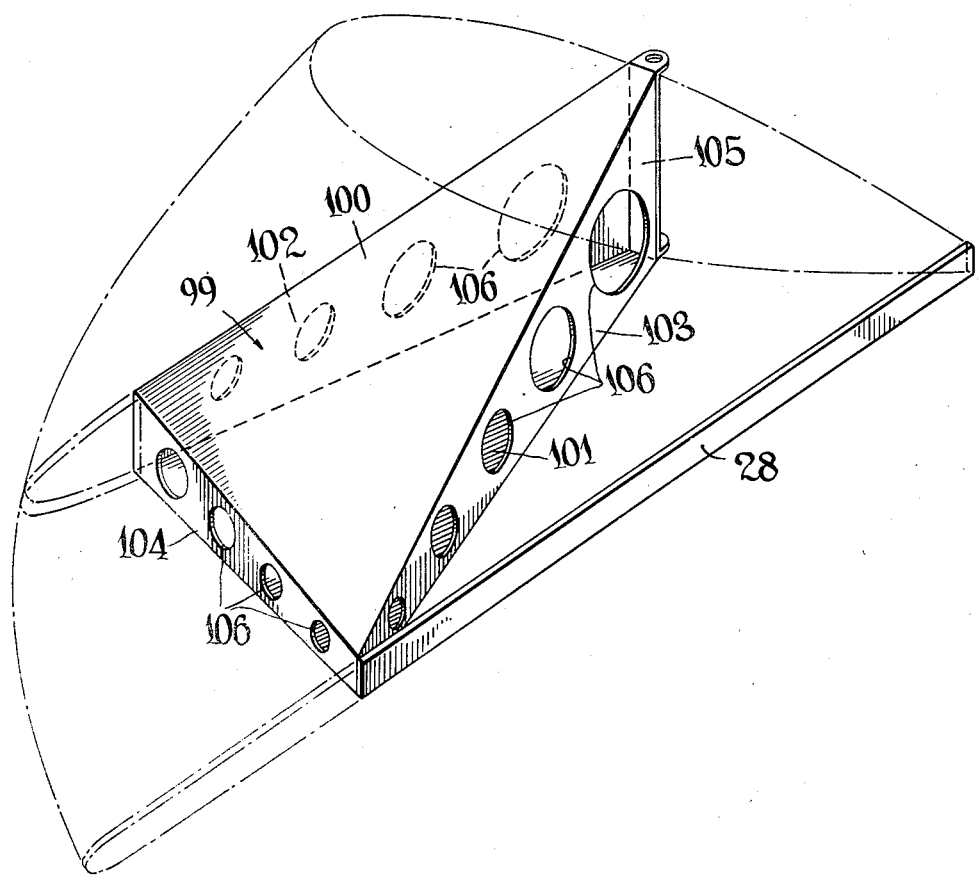

Patented Apr. 23, 1940

2,198,496

UNITED STATES PATENT OFFICE 2,198,496

AIRCRAFT

Joseph M. Gwinn, Jr., Buffalo, N. Y.

Application December 1, 1937, Serial No. 177,577

10 Claims. (Cl. 244—87)

This invention relates to aircraft, and more particularly to the bracing of wings, fins, flaps and other airfoil structures.

In the design of airfoil structures it is a primary objective to provide a structure capable of resisting distortion under service airloads through use of a minimum amount and weight of materials. Preferably, the elements bracing the airfoil should be disposed internally of the contour of the structure; and in connection with this type of construction the bracing of relatively thin portions or portions remote from the root of the airfoil against deflection away from the general plane of the airfoil has heretofore involved the use of a disproportionate amount of structural material. This is particularly true in the case of airfoils which are adjustably mounted upon an aircraft by means of connections located at a limited number of points.

It is an object of the present invention to provide in an airfoil structure an improved and simplified system of internal bracing meeting the foregoing requirements and avoiding the foregoing disadvantages. The invention contemplates the provision of primary cantilever beams extending approximately span-wise of the airfoil from a common support upon an aircraft fuselage, and a system of secondary structural members connected to the primary elements in such manner that they transmit forces normal to the plane of the airfoil into the primary elements and the aircraft fuselage, and residual span-wise loads into the fuselage at a point spaced from the support of the cantilever beam, and means synchronizing deflections of opposed portions of the cantilever beams. Residual torsion about a span-wise axis extending through the cantilever beam supports is taken in vertical shear at the spaced point of connection between a secondary structural member of the airfoil and the airplane fuselage. This, a complete airfoil structure is provided as comprising one or more relatively deep primary structural elements having a common root location and adapted to take all transverse bending loads, and secondary relatively shallow structural elements adapted primarily to transmit loads normal to the plane of the airfoil into the cantilever beams and residual loads to the fuselage at the spaced point of connection, and torsionally rigid bracing elements adapted to transmit bending moments between the primary members by synchronizing slopes of their opposed portions. Thus, it is possible to provide a limited point method of attachment of an airfoil structure to an airplane fuselage for either fixedly or adjustably mounted airfoil types, wherein relative stability and maximum rigidity are obtained through use of a minimum amount of structural material, all of which is disposed internally of the contour of the airfoil structure.

The invention is exemplified by the provision of a plurality of spars radiating from a common support and having opposed portions of each adjacent spar synchronized in slope by means of a member which is primarily designed for rigidity in torsion and connected to the spars in such manner as to prevent axial rotation of the member relative to the spars. Thus, the amounts of rotation in bending of the spars at their points of attachment to the torsion member are substantially equal regardless of the location of the center of pressure of the externally applied loads, and a rigid airfoil structure of minimum thickness dimensions is provided.

In the drawings:

Fig. 1 is a fragmentary plan of an aircraft fuselage and a wing panel structure pivotably mounted thereon, incorporating the principles of the invention;

Fig. 2 is a vertical section on an enlarged scale taken substantially along line II—II of Fig. 1;

Fig. 3 is a vertical section on an enlarged scale taken along line III—III of Fig. 1;

Fig. 4 is a vertical section on an enlarged scale taken along line IV—IV of Fig. 1; and Fig. 5 is a diagrammatic perspective view of another form of the invention.

An aircraft wing panel 10 of the type commonly employed as a tail wing or stabilizer, is shown herein as being rotatably mounted upon an aircraft fuselage 12, such as for purposes of adjustably balancing the aircraft flight. The principles of the invention, however, have equal application to fixedly mounted airfoil structures of the wing or fin types. The skeleton of the wing panel 10 comprises a primary spar member 14 which is disposed generally spanwise of the wing panel and may be in any suitable form of beam which is primarily designed to take loads disposed transversely of the plane of the wing panel. For instance, the spar 14 may be in the form of a deep channel or I beam or box girder, and is preferably arranged internally of the wing panel in such manner that its root end is disposed in the approximate location of the thickest portion of the airfoil.

A second primary spar member 16, having its root adjacent the root of the primary spar member 14 and connected thereto as by means of riveting to a web plate 18, extends therefrom in divergent relation with respect to the primary spar member 14 through an intermediate portion of the wing structure toward a remote corner portion of the wing. Hence an arrangement has been provided whereby all primary spars may be of maximum depth at their root ends. Thus each spar is of maximum individual rigidity. A torsion member 20, preferably provided in the form of a tube to obtain maximum rigidity in torsion in combination with minimum weight, is flanged at each end and connected to the primary spar, as at 22, and adjacent the outer end of the spar 16, as at 24, by means of rivets or other means of such character as to prevent relative rotation of adjacent portions of the torsion member and the spars.

Hence, means have been provided for synchronizing slopes of opposed portions of the spar members 14 and 16. For example, any tendency of the outer end of spar 16 to become deflected from the plane of the wing panel will be accompanied by a bending moment in the spar 16 about the spar root which tends to bow the spar 16 and rotate the axis of its outer end portion relative to the axis of the spar 14. The tubular member 20, being rigidly connected to the tip end of the spar 16 and the opposed portion of the spar 14, and being rigid in torsion, transmits a relieving bending moment from spar 16 into spar 14 in such amount as to make their slopes substantially equal at their points of attachment to the tube. Thus, the bending load on the most heavily loaded beam is reduced by a sharing of its load with the more lightly loaded beam. Hence, the deflection of the most heavily loaded beam is reduced, thereby producing the effect of increased rigidity by more evenly distributing the loads through the panel structure.

The wing panel structure is completed as comprising wing contour former ribs 25 attached to the spar members and extending in spaced transverse relation therewith to define the sectional contour of the wing and to receive the wing covering material thereon. A nose piece 26, of any suitable section and construction, is connected to the forward ends of the former ribs to define the leading edge of the wing. A trailing edge strip 28 of any suitable section and construction connects the rearward ends of the former ribs 25 to define the trailing edge of the wing. A cantilever beam 27 is rigidly connected to the root end connection of the primary spars 14 and 16 and extends transversely therefrom to points of connection with the inboard ends of the leading and trailing edge pieces 26 and 28, and thus completes the plan contour of the airfoil. The beam 27 may also be formed in sectional dimensions so as to constitute a sectional contour former element for supporting the airfoil covering.

In the case of either adjustable or fixedly mounted fin or wing constructions, the wing panel, as above defined, is adapted to be mounted in cantilever extending relation from the fuselage in an improved manner. To provide a satisfactory mounting in the case of an adjustable wing or fin construction the primary spar 14 may be connected by means of pins 29 to a similarly designed cross beam 30 extending through the adjacent portion of the fuselage, and secured thereto by horizontally pivotable connecting means, as at 32, which are capable of resisting all forces except rotative forces about the axis of the connection 32. A third point of connection between the airfoil and the fuselage is provided, as at 36, by means of a vertically secure connection 38 between the end portions of the beam 27 and a second cross beam 40 which is vertically supported relative to the fuselage, as at 36. The connection 36 is required to take only vertical shear forces from the beam 27 and trailing edge piece 28 resulting from the moments of air pressure forces about the axis of the pivotal connection 32, all moments about a line through point 38 transversely of pivotal connection 32 being taken through the spar and beam members 14, 16 and 30. The transference of the vertical force from point 38 to point 36 produces a small bending moment which may preferably be taken in point 38 to prevent binding in the means of vertical adjustment of connection 36, described hereinafter.

The trailing edge strip 28 is formed in such manner as to successfully resist simple beam loads such as are imposed thereon between the points of connection 24 and 36, without undue deflection. Hence, the trailing edge strip 28, may be formed of relatively shallow section, and likewise the connection 38 and the beam 40 need only be relatively shallow in section.

The cross beam 30 is pivotally mounted, as at 32 upon any suitable supporting structure of the aircraft fuselage, thus providing a hinge-like mounting for the panel 10 upon the fuselage 12. At 36 the second cross bar 40 is connected to an adjacent portion of the fuselage in vertically adjustable relation by any suitable means such as a threaded shaft 45 which is swivelly mounted as at 46 upon a fuselage cross bar 48. A threaded nut 50, swivelly mounted within the cross bar 40 receives the shaft in threaded relation therein. A sprocket 52, keyed to the shaft 45 is connected to some conveniently disposed pilot operable control member (not shown) by means of a flexible chain 54. Hence, actuation of the pilot operable control member rotates the shaft 45 to raise or lower the cross bar 40 relative to the fuselage 10, and through means of the connections 38, raises or lowers the trailing edge of the wing panel for changing the angular disposition of the panel relative to the fuselage for flight control purposes.

In the case of a fixedly mounted fin or wing construction, the cross beam 30 as in the previous case, may be either an integral part of the spar 14 or a detachable inter-connecting means between spars of opposed panels. In lieu of the pivotal construction described above, the connecting means 32 may be in the form of any suitable rigid supporting and connecting means between the beam 30 and adjacent portions of the fuselage. In this case it is not necessary to take residual torsion moments around 32 as vertical loads in connection 38. Likewise, the points of connection 38 may be provided in the form of direct attachments to the fuselage structure, thus obviating all bending moments at 38.

By reason of the principles of the present invention, such construction involves features which are of considerable advantage in connection with the general arrangement and design of aircraft. For instance, a stable cantilever wing construction may be provided wherein only one relatively deep spar need be employed, and only one corresponding and relatively deep truss or other connecting and supporting means need be provided in the interior of the aircraft fuselage. In previous types of airplanes it has been found necessary to extend at least two relatively deep girders transversely through the interior of the fuselage to provide the necessary cantilever anchoring means for the main wing. The presence of these girders has necessitated either an otherwise unnecessary enlargement of the vertical dimension of the fuselage with an accompanying increase in frontal area or an arrangement involving a disposition of the grders above the floor line of the passenger compartment in the fuselage in the form of obstructions over which the passengers have been required to walk. It will be seen that in the case of an aircraft incorporating the features of the present invention, only one such relatively deep girder member need be reckoned with, and in the majority of cases, it will be found possible to incorporate such a girder in a step or wall portion of the fuselage at an end of the passenger compartment, as for example at the entrance way into the cargo carrying space located either ahead or behind the passenger compartment. Thus, the frontal resistance of the fuselage to the airstream will be reduced and the convenience of the passengers enhanced.

As illustrated in Fig. 5, the torsionally rigid slopes synchronizing element of the structure may take the form of a laterally enlarged tubular-like casing 99 in lieu of the tube 20 previously described. The casing 99 is arranged to extend between spaced opposed cantilever beam elements 102 and 103 corresponding to spars 14 and 16 of Fig. 1, and comprises end wall portions 104 and 105 and top and bottom wall portions 100 and 101, respectively. Thus, the primary bracing elements of the structure, and the means for synchronizing the slopes thereof may be provided in the form of a closed cell. This may be the preferred structure in the case of airfoils having rigid coverings and wherein the top and bottom portions of the cell may locally form parts of the airfoil covering. Obviously, holes 106 may be formed in the wall portions of the cell to provide means of access therethrough and/or to reduce the weight of the structure, without deviating from the principles of the invention.

Although a limited number of forms of the invention have been shown and described in detail, it will be apparent to those skilled in the art that the invention is not so limited but that various changes can be made therein without departing from the spirit of the invention or from the scope of the appended claims.

What is claimed is:

1. In an airfoil, means on the root end of said airfoil for connecting said airfoil to an aircraft fuselage, said connecting means being adapted to resist translative forces in all directions and rotative forces directed solely in a plane disposed substantially spanwise and normal to the plane of said airfoil, and a load force transmitting unit disposed within the interior of said airfoil for transmitting forces upon said airfoil directed normal to the plane thereof to said connecting means, said unit comprising a pair of spaced opposed side members rigidly connected to and diverging from said connecting means and adapted to resist forces directed normal to the plane of said airfoil, and a torsionally rigid member comprising side and top and bottom wall portions extending between and connected to said opposed side members against axial rotation relative thereto for synchronizing the slopes of opposed portions of said side members.

2. In an airfoil, means on the root end of said airfoil for connecting said airfoil to an aircraft fuselage, said connecting means being adapted to resist translative forces in all directions and rotative forces directed solely in a plane disposed substantially spanwise and normal to the plane of said airfoil, and a load force transmitting unit disposed within the interior of said airfoil for transmitting forces upon said airfoil directed normal to the plane thereof to said connecting means, said unit comprising a pair of spaced opposed side members rigidly connected to and diverging from said connecting means and adapted to resist forces directed normal to the plane of said airfoil, and a torsionally rigid member comprising side and top and bottom wall portions extending between and connected to said opposed side members against axial rotation relative thereto for synchronizing the slopes of opposed portions of said side members, said top and bottom wall portions forming parts of the covering of said airfoil.

3. An airfoil attached to an aircraft fuselage along a single line intersecting the plane of said airfoil and also at a point spaced from said line, said airfoil extending in cantilever form from said line attachment and including cantilever spars having their roots at said line of attachment, and a torsion resisting member extending between and rigidly connected to opposed portions of said spars at a position spaced from said line for synchronizing the slopes of said spars at said opposed portions.

4. An airfoil attached to an aircraft fuselage along a single line intersecting the plane of said airfoil and also at a point spaced from said line, said airfoil extending in cantilever form from said line attachment and including beam members disposed transversely of the plane of said airfoil and having a common root at said line, and a beam slope synchronizing element extending between and connecting said beam members.

5. An airfoil attached to an aircraft fuselage along a single line intersecting the plane of said airfoil and also at a point spaced from said line, said airfoil extending in cantilever form from said line attachment and including beam members disposed transversely of the plane of said airfoil and having a common root at said line attachment and diverging therefrom, and a beam slope synchronizing element extending between and connecting said beam members and comprising a casing having spaced connected wall portions forming in association with portions of said beam members a closed cell structure resistant to torsion around an axis intersecting said beam members, said beam members and said casing being disposed within the contour of said airfoil.

6. In an aircraft, a fuselage, an airfoil fixedly mounted upon said fuselage and extending therefrom, said airfoil including divergent cantilever spars anchored to the aircraft fuselage at coincident roots, a torsionally resistant bracing member extending between and rigidly connected to opposite portions of said spar members, said bracing member being located at a remote position with respect to said roots for synchronizing the slopes of said opposite portions of said spar members, and a member capable of resisting axial loads connected to one of said spars and extending therefrom to a point of connection with said fuselage spaced from said spar roots.

7. In an aircraft having a fuselage, an airfoil adjustably mounted upon said fuselage and including a cantilever spar extending transversely of and beyond said fuselage, means for mounting said spar thereon in axially rotatable relation, a second spar rigidly connected at its root end to said first mentioned spar at a location adjacent the position of said mounting means and extending therefrom to a portion of said airfoil disposed remotely with respect to said first mentioned spar, a torsionally resistant bracing member extending between and connected to opposite portions of said spar members for synchronizing the slope of said portion of said second mentioned spar with the slope of the portion of said first mentioned spar that is disposed oppositely thereto, a beam connected to the root end of said first mentioned spar and extending therefrom in the plane of said airfoil in a direction disposed transversely of the axis of rotation of said first mentioned spar to a point of adjustable connection to said fuselage at a location spaced from the axis of rotation of said first mentioned spar to transmit airfoil torsion forces to said mounting means and said adjustable connection, a member capable of resisting axial loads extending between and connecting said second spar and said beam adjacent said point of adjustable connection, and a diagonal bracing member connected to and extending between said member and said first mentioned spar at a location adjacent said rotatable mounting means and spaced from the root end of said second mentioned spar, and means for adjusting said airfoil at said point of adjustable connection with said fuselage to different positions of adjustment about the axis of said spar rotative mounting means.

8. In an aircraft, a fuselage, an airfoil adjustably mounted upon said fuselage, said airfoil including a relatively deep spar extending transversely of said fuselage and laterally therefrom to support opposed panels of said airfoil structure in cantilever relation relative to said fuselage, means for mounting said spar in axially rotatable relation relative to said fuselage, a second spar in each of said airfoil panels, said second spars being connected at their root ends to said first mentioned spar adjacent said rotative mounting means and extending from their root ends in diverging relation with respect to said first mentioned spar toward respective panel tip ends opposed to said first mentioned spar tip ends, a torsionally rigid bracing member in each airfoil panel connected to and extending between opposed portions of said first mentioned and said second mentioned spars, and a beam rigidly connected to said first mentioned spar and extending transversely therefrom to a point of adjustable connection with said fuselage, said point of adjustable connection being spaced from the rotative axis of said first mentioned spar mounting means, and means for actuating the extending end portion of said beam about said rotative axis to various adjusted positions.

9. In an aircraft, a fuselage, a beam rotatably mounted transversely of said aircraft fuselage, an airfoil including a primary spar adapted to resist bending moments normal to the plane of said airfoil, said spar being connected to one end of said beam against movement relative thereto transversely of the plane of said airfoil, a second primary spar member having its root adjacent the root of said first primary spar and extending therefrom in radiating relation toward an extremity of said airfoil structure, a torque tube extending between opposed portions of said spar members at locations spaced from said spar roots and connected thereto against axial rotation relative to said spars.

10. In an aircraft, a fuselage, a beam adjustably mounted transversely of said aircraft fuselage, an airfoil including a primary spar adapted to resist bending moments normal to the plane of said airfoil, said spar being connected to one end of said beam against movement relative thereto in directions intersecting the plane of said airfoil, a second primary spar member having its root adjacent the root of said first primary spar and extending therefrom in radiating relation toward an extremity of said airfoil structure, and a torque tube extending between opposed portions of said spar members at locations spaced from said spar roots and connected thereto against axial rotation relative to said spars.

JOSEPH M. GWINN, Jr.